United States Patent Office 3,111,528
Patented Nov. 19, 1963

3,111,528
BROMINATION OF FLUORESCEIN
Theodore Ashmead Langstroth, Staten Island, N.Y., assignor to Sun Chemical Corporation, New York, N.Y., a corporation of Delaware
No Drawing. Filed Jan. 19, 1962, Ser. No. 167,495
6 Claims. (Cl. 260—335)

This invention relates generally to the bromination of fluorescein and more particularly to a novel process for the selective bromination of fluorescein so as to obtain substantially pure dibromofluorescein.

Fluorescein and its various brominated derivatives are classified as coal tar dyes of the xanthene family and when certified they are widely employed as tinting agents for various greasy cosmetic compositions such as lipstick compositions. The brominated derivatives of fluorescein are usually prepared by reacting fluorescein and bromine in a suitable solvent until the bromination is complete. However, the heretofore practiced bromination processes suffered from many disadvantages which stemmed from the fact that when fluorescein was reacted with bromine in said processes, the reaction mixture was composed of a wide variety of brominated derivatives such as monobromofluorescein, dibromofluorescein, tribromofluorescein, tetrabromofluorescein as well as unreacted fluorescein. In view of the fact that each derivative of fluorescein has its own individual color, it became necessary to employ elaborate and expensive processing techniques in order to separate each individual brominated derivative from the reaction mixture. Additionally, in view of the fact that the brominated derivatives are employed in cosmetic preparations, federal regulations required high standards of purity which could not be met by the reaction product of bromine and fluorescein until the elaborate separation techniques were carried out.

Therefore, it is the primary object of this invention to provide a novel process for the bromination of fluorescein, said process being selective towards dibromofluorescein.

It is still another object of this invention to provide a novel process for the bromination of fluorescein, said process being efficient, economical and capable of yielding dibromofluorescein in good yields.

It is still another object of this invention to provide a novel process for the bromination of fluorescein so as to be able to obtain dibromofluorescein of sufficiently high purity directly from the reaction mixture without the necessity of employing elaborate and expensive separation techniques.

It has now been found that the above objects can be attained by forming a solution of bromine and an alkali metal hydroxide and gradually adding this solution to a solution consisting of fluorescein, water and an alkali metal hydroxide, stirring the mixture until bromination is complete at a high pH and then rapidly adding a predetermined amount of certain acids to quickly change the pH of the solution to the acid side.

The two most critical features of the instant process reside in the manner in which acid is added after bromination has been completed and the high pH of bromination. It is absolutely critical in the process of this invention that the acid be added as rapidly as possible in contradistinction to a gradual addition of the acid.

High pH favors the formation of dibromofluorescein and it has been found that if acid is gradually added to the reaction mixture, the resulting reaction product will consist of a mixture of brominated derivatives including the monobromofluorescein, the dibromofluorescein, the tribromofluorescein, and the tetrabromofluorescein (presumably due to the rearrangement of bromine or the fluorescein at the different pH's incident to the gradual addition of acid). On the other hand, if all the acid is added in one step, the resulting reaction product will be dibromofluorescein in purities as high as 96–99 percent to the substantial exclusion of any other brominated derivative.

As has heretofore been pointed out, the novel process of this invention is carried out by adding a solution of bromine in an aqueous metal hydroxide to a solution consisting of fluorescein and an aqueous alkali metal hydroxide at a high pH, stirring until bromination is complete and then adding sufficient quantity of acid to quickly lower the pH as rapidly as possible. Although the relative proportions of bromine and fluorescein are not narrowly critical, nevertheless it has been found that an excess of bromine should be employed in order to obtain the desirable results heretofore set forth. It has been found that from 1.05 to 1.5 parts by weight of bromine per part of fluorescein is particularly advantageous.

The bromine solution which is added to the fluorescein solution is conveniently prepared by adding liquid bromine to an aqueous solution of an alkali metal hydroxide while the entire solution is maintained at temperatures from 0° C. to 5° C.

The preferred temperature is 0° C. The amount of water employed is not narrowly critical but sufficient water must be employed so as to substantially dissolve all of the bromine which is added. On the other hand, the amount of alkali metal hydroxide employed is critical and sufficient alkali metal hydroxide should be employed so that the final pH of the bromine solution consisting of bromine and aqueous metal hydroxide has a pH in the range of from 11 to 12. The preferred amount of alkali metal hydroxide employed is such that the pH of the final solution be 12.

Similarly, the amount of water employed in the fluorescein solution consisting of fluorescein, water and alkali metal hydroxide is also not narrowly critical and the only requirement being that there be a sufficient amount of water employed so as to dissolve the amount of fluorescein which is being brominated. However, the amount of alkali metal hydroxide employed is critical and a sufficient amount of alkali metal hydroxide must be employed so that the final pH of the fluorescein solution is within the range of from 8 to 12. The preferred alkali metal hydroxide is that amount which will make the pH of the final fluorescein solution from 9.5 to 10.5. The fluorescein solution is conveniently prepared by adding the desired amount of fluorescein to an aqueous alkali metal hydroxide solution maintained at a temperature of from 0 to 35° C. and stirring constantly. The preferred temperature of the fluorescein solution is around 25° C.

In a preferred embodiment of this invention, it has been found that it is advantageous to employ an aliphatic alcohol to replace part of the water in the solution consisting of fluorescein and the alkali metal hydroxide. The amount of aliphatic alcohol employed is obviously not critical since it is not absolutely essential to use it. However, it has been found that if an aliphatic alcohol in an amount equal to about the weight of the fluorescein employed is added to the solution of fluorescein and alkali metal hydroxide, the preparation of the fluorescein solution progresses much more smoothly. The aliphatic alcohols which can be employed are those aliphatic alcohols which have from 1–3 carbon atoms in their structure. The preferred aliphatic alcohol is ethyl alcohol.

The bromination reaction is carried out merely by adding the bromine solution previously described to the fluorescein solution and maintaining the temperature of the mixture from 25° C.–35° C. while constant stirring is employed, over a period of 30 minutes. The amount of time necessary for the bromination reaction to take place is obviously dependent upon the amount of fluorescein and bromine employed. However, it has been found that the bromination reaction is completed in about 15 minutes after addition of bromine.

The alkali metal hydroxides which can be employed in preparing the bromine solutions and the fluorescein solutions can be sodium hydroxide, potassium hydroxide, or any alkaline substance capable of giving a pH of 12, e.g., ammonium hydroxide. The preferred alkali metal hydroxide is sodium hydroxide.

As has heretofore been pointed out, one of the two critical features in the novel process of this invention resides in the addition of a predetermined amount of certain selected acids to the mixture of the bromine solution and fluorescein solution as rapidly as possible, as opposed to a gradual addition of said acid. The acids which have been found to be operable are sulphuric acid, hydrochloric acid, and phosphoric acid; with phosphoric acid being particularly preferred. The amount of acid which is added to the reaction mixture is extremely critical and an amount of acid added must be such that the final pH of the solution is within the range of from 2–4; with from 2.4 to 2.8 being particularly preferred. The addition of acid is conveniently carried out by calculating the required amount of acid necessary to obtain the pH within the range of from 2–4 and then placing that acid into any suitable vessel. Then the necessary acid is dumped into the bromine-fluorescein reaction mixture and the temperature of the entire mixture is controlled so that the temperature does not rise above about 40° C. After the acid has been added, the mixture is stirred in order to allow complete contact with the acid. The resulting dibromofluorescein can be recovered from the reaction vessel merely by filtering into a press and washing the resulting cake with water until free of acids and chlorides. The dibromofluorescein is then dried in an oven at 75° C.

The following example will illustrate the novel process of this invention but it is to be understood that it is not intended to be limited thereto.

*Example*

A. 140 lbs. of sodium hydroxide was added to 1500 lbs. of water and stirred. To this solution was added 1000 lbs. of ice and the entire solution was stirred for 10 minutes. The temperature of the solution was 0° C. and this temperature could be maintained by adding more ice if it was necessary. To this solution there was added 220 lbs. of bromine with constant stirring.

B. 180 lbs. of fluorescein was added to a reaction vessel which contained 100 lbs. of ethyl alcohol. The fluorescein and alcohol was stirred and there was then added 5000 lbs. of water while stirring was continued. To this solution there was added 100 lbs. of a 50% solution of sodium hydroxide and the mixture was again stirred. The pH of the resulting fluorescein solution was from 9.5 to 10.5. Temperature is 25° C.

Solution A was added to solution B with stirring over 30 minutes. After all the bromine solution had been added, stirring was continued for an additional 15 minutes. 500 lbs. of phosphoric acid was then dumped into the reaction mixture and stirred for 5 minutes. The pH of the resulting mixture was 2.4 to 2.8.

After washing the reaction mixture and drying, the reaction product was 4,5-dibromofluorescein of 96–99 percent purity.

Many modifications of the above example will appear obvious to those skilled in the art such as the use of equivalent materials mentioned in the specification. Therefore, it is not intended that this invention be limited except as necessitated by the appended claims.

What is claimed is:

1. A process which comprises adding a bromine solution having a pH of from 11–12 and consisting essentially of bromine, water and a base selected from the group consisting of sodium hydroxide, potassium hydroxide, and ammonium hydroxide to a fluorescein solution having a pH of from 8 to 12 and consisting essentially of fluorescein, water, and a base selected from the group consisting of sodium hydroxide, potassium hydroxide, and ammonium hydroxide, stirring at a temperature of from 25–35° C. until bromination is substantially complete and then rapidly adding an amount of an acid selected from the group consisting of sulphuric acid, hydrochloric acid, and phosphoric acid so as to change the pH of the reaction mixture within the range of from 2 through 4.

2. The process of claim 1 wherein the total amount of bromine employed is from 1.05 to 1.5 parts by weight per part of fluorescein.

3. The process of claim 2 wherein the fluorescein solution also contains at least one saturated aliphatic alcohol having from 1–3 carbon atoms.

4. The process of claim 3 wherein the aliphatic alcohol is ethyl alcohol.

5. A process which comprises adding a bromine solution having a pH of from 11–12 and consisting essentially of bromine, water, and sodium hydroxide to a fluorescein solution having a pH of from 8–12 and consisting of fluorescein, water, methanol, and sodium hydroxide, stirring the resulting mixture at a temperature of from 25–35° C. and then rapidly adding a sufficient quantity of phosphoric acid so that the resulting mixture will have a pH in the range of from 2–4.

6. The process of claim 5 wherein the amount of acid added is such that the pH of the resulting mixture will be in the range of from 2.4–2.8.

No references cited.